United States Patent [19]

Ray

[11] Patent Number: 5,375,000
[45] Date of Patent: Dec. 20, 1994

[54] METHOD AND APPARATUS FOR GENERATING REPRESENTATION OF AN IMAGE FROM A TRANSPARENCY

[75] Inventor: Andrew R. Ray, Robert Wilfred Rayner, both of Herts, England

[73] Assignee: Crosfield Electronics Limited, Hertfordshire, England

[21] Appl. No.: 793,945

[22] Filed: Oct. 22, 1991

[30] Foreign Application Priority Data

Oct. 23, 1990 [GB] United Kingdom ........... 9023013

[51] Int. Cl.$^5$ .................................................. H04N 1/46
[52] U.S. Cl. ..................................... 358/506; 358/520; 358/523; 358/487
[58] Field of Search ............. 358/80, 76, 32, 54, 358/487, 401, 474, 80, 75, 78, 76, 463, 464, 518, 505, 506, 523, 509, 513, 514, 510, 519, 520, 500

[56] References Cited

U.S. PATENT DOCUMENTS

| | | | |
|---|---|---|---|
| 4,418,358 | 11/1983 | Poetsch et al. | 358/80 |
| 4,635,101 | 1/1987 | Nakayama | 358/76 |
| 4,812,879 | 3/1989 | Suzuki | 358/76 |
| 4,825,297 | 4/1989 | Fuchsberger et al. | 358/80 |
| 4,849,775 | 7/1989 | Izumi . | |
| 4,866,513 | 12/1989 | Takahashi . | |
| 4,970,584 | 11/1990 | Sato et al. | 358/80 |
| 5,018,085 | 5/1991 | Smith et al. | 358/80 |
| 5,150,207 | 2/1991 | Someya | 358/136 |
| 5,166,803 | 11/1992 | Sasakura | 358/323 |

FOREIGN PATENT DOCUMENTS 0255127 2/1988 European Pat. Off. .

OTHER PUBLICATIONS

Rafael C. Gonzalez and Pual Wintz, "Digital Image Processing", published 1977, pp. 145–149.
"Moglichkeiten Zur Verbesserung Der Filmwiedergabe Im Fernsehen Durch Anpassung Der Systemparameter Mit Elektronischen Mitteln", Von Gerhard Holoch, Nov. 10, 1981, Rundfunktechnische Mitteilungen, pp. 1–9.
Patent Abstracts of Japan, vol. 7, No. 267, Nov. 29, 1983, JP-A-58-151175 and 151176.

Primary Examiner—Edward L. Coles, Sr.
Assistant Examiner—Fan Lee
Attorney, Agent, or Firm—Sughrue, Mion, Zinn, Macpeak & Seas

[57] ABSTRACT

A method of generating a representation of an image comprises scanning a film (2) carrying an image to which the film has been exposed to obtain signals (4,5,6) representing the color component content of the recorded image. During exposure of the image its appearance has been modified in accordance with a function characteristic of the film. The signals obtained are modified with a function (11,10,8) constituting the inverse of the film characteristic function to compensate.

4 Claims, 3 Drawing Sheets

AXES ZEROED
ON AIR

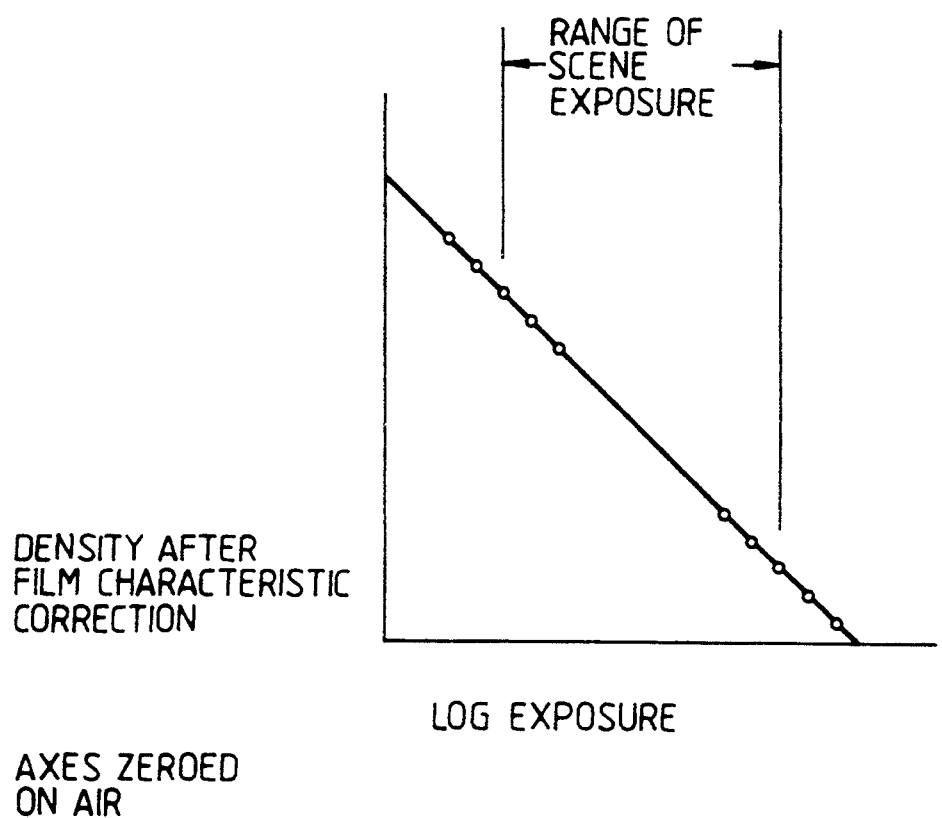

METHOD AND APPARATUS FOR GENERATING REPRESENTATION OF AN IMAGE FROM A TRANSPARENCY

FIELD OF THE INVENTION

This invention relates to a method for generating a representation of an image, in particular where the input image is scanned from a film.

DESCRIPTION OF THE PRIOR ART

When an image is captured on film with normal exposure there will be a difference in appearance between the actual scene and the image, caused by the characteristic response of film. The effect of this is generally an expansion of detail in the midtones and compression of detail in highlight and lowlight regions. For a normally exposed scene the distortion is not large and in most cases it will be considered a reasonable reproduction. However for images with high lowlight and highlight content, the distortion becomes obvious and requires correction. Similarly an incorrectly exposed image will suffer distortion which needs to be corrected.

U.S. Pat. No. 4,849,775 describes colour correction for a thermal printing system in which image data from a source, including from a document scanner, is corrected by deriving a correction curve. This is derived from the relationship between the gradations of the image data and optical density values from a grey scale chart. The derived curve is such that the optical density values and corrected gradations are linearly related.

U.S. Pat. No. 4,866,513 describes deriving a gamma value to correct RGB signals from the average, maximum and minimum values of each colour signal within a single frame according to the characteristic values detected.

SUMMARY OF THE INVENTION

In accordance with the present invention a method of generating a representation of an image comprises a) scanning a film carrying an image to which said film has been exposed, and wherein during exposure the appearance of said image has been modified in accordance with a characteristic function of said film, b) obtaining signals representing the colour component content of said image recorded on said film, and c) modifying said signals with a function constituting the inverse of said characteristic function of said film.

The application of an inverse film characteristic function to the image removes the effects of the film so that a more accurate representation of the original image is obtained. It is a simpler method than has previously been used, yet provides more exact compensation.

Preferably the method further comprises applying a chosen film characteristic to the compensated image. This method is equally applicable to scanning colour and monochrome films. In the case of a colour film characteristic functions exists for each colour which may differ from each other, but in combination produce a characteristic function of the film.

In accordance with a second aspect of the present invention, apparatus for generating a representation of an image comprises scanning means to scan a film carrying an image to obtain signals representing the colour component content of the recorded image, and modifying means to modify signals with a function constituting the inverse of a film characteristic function.

The apparatus may be further provided with means to apply any chosen characteristic to the compensated image. Preferably the means for modifying the signals obtained by scanning the image comprise a log amplifier and the signals are converted to density signals.

BRIEF DESCRIPTION OF THE DRAWING

An example of a method of generating a representation of an image in accordance with the present invention will now be described with reference to the accompanying drawings in which:

FIG. 5 is a graph relating density of the film after characteristic correction to exposure.

EMBODIMENT

When an image is read into an electronic scanning system, two points are chosen within the image that represent the reference white and black points. These are termed, enter white—EW and enter black—EB. These values are used to define the range of densities over which the information of interest is distributed. The reasons for this representation are firstly it is not always possible to reference the zero of the density axis to be the value of the EW point. This arises from being required to calibrate the measuring device initially with no film being present. When the film is introduced, the density of the substrate must be taken into account, resulting in an offset for the EW from the calibrated zero density. Secondly the dynamic range for various film categories may vary. This results in different separations for the EW and EB values for different film categories. Films may undergo different changes of density range in mid-tone and tail regions. If it is a common film, it results in an expansion of mid-tones and compression of highlight and lowlight details.

Figure 1:
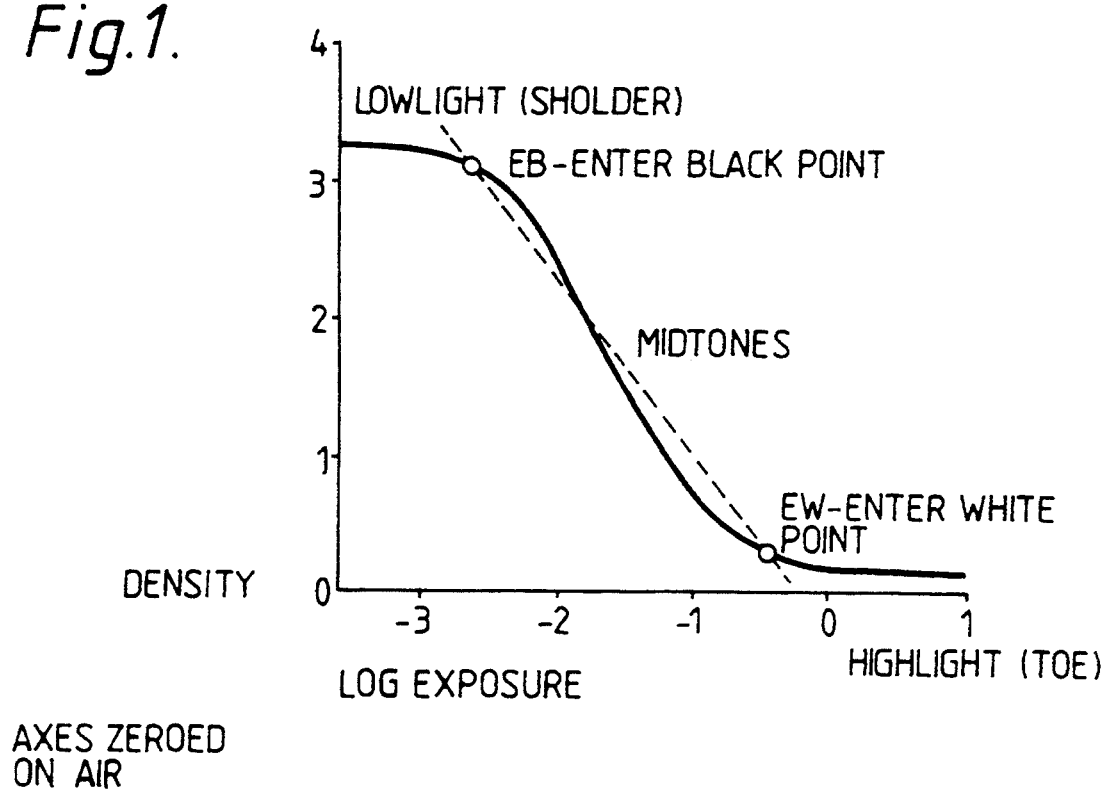
FIG. 1 shows a density/exposure graph for a typical daylight colour film.
Figure 2:
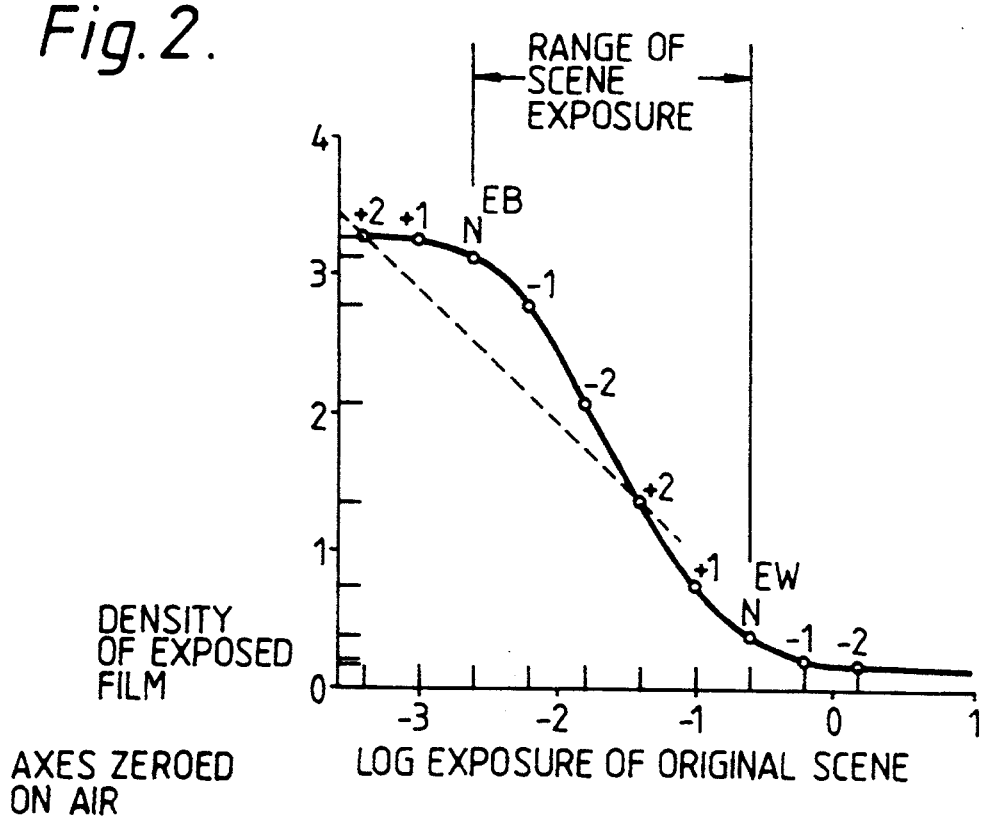
FIG. 2 is a graph showing the relationship of the density of the exposed film to the exposure of the original scene.

The midtone region undergoes an expansion of density range while the lowlight and highlight regions are compressed. The Enter White and Enter Black points are the white and dark points in an image. These represent the range of exposure for a normal scene. Joining the EW and EB points (FIG. 1) is a dashed line representing the film characteristic seen by scanners where no account of the shape of the film characteristic is made. The difference between the dashed line and the film characteristic curve is the distortion observed in an image when compared to the original scene.

Where the image is incorrectly exposed there will be greater distortion effects. This is shown in FIG. 2 where the exposure is varied in one stop steps either side of normal exposure. It can be seen that although the original scene exposures have equal increments and range, their respective film densities are irregular. Large distortions are introduced in the lowlight regions for under exposed images and similar distortions in the highlight regions of over exposed images. If the exposure is too extreme, density levels will merge with the extremes of the curve, and will not be recoverable subsequently. The dashed line indicates an example of this where some lowlight values are merged and information content lost. The effect of this is that there are problems in recovering information from images which are either incorrectly exposed or which contain important information near the EW and EB points.

Figure 3:
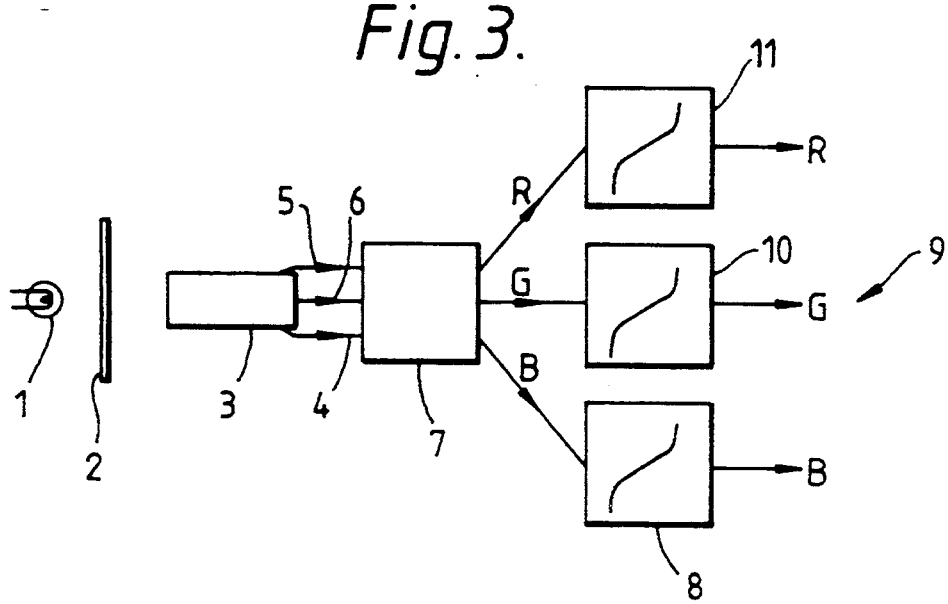
FIG. 3 shows a block diagram of the apparatus used in compensating the scanned image.

To compensate for these problems a system as shown in FIG. 3 is used to apply an inverse characteristic to produce a linear output corresponding to the density profile of the original scene. A light source 1 illuminates a film transparency 2 carrying an image to enable a scanning system 3 of conventional form to scan the image on the transparency 2. The colour component content of the image is divided into red green and blue signals 4,5,6 by the scanning system 3 which are input to a log amplifier 7. The log amplifier 7 converts the signals from the imaging system 3 into density signals. The red, green and blue density signals address respective look-up tables 11,10,8 which store the inverse film characteristic function for each colour. Modified values representing compensated image are output 9 from the look-up table.

Figure 4:
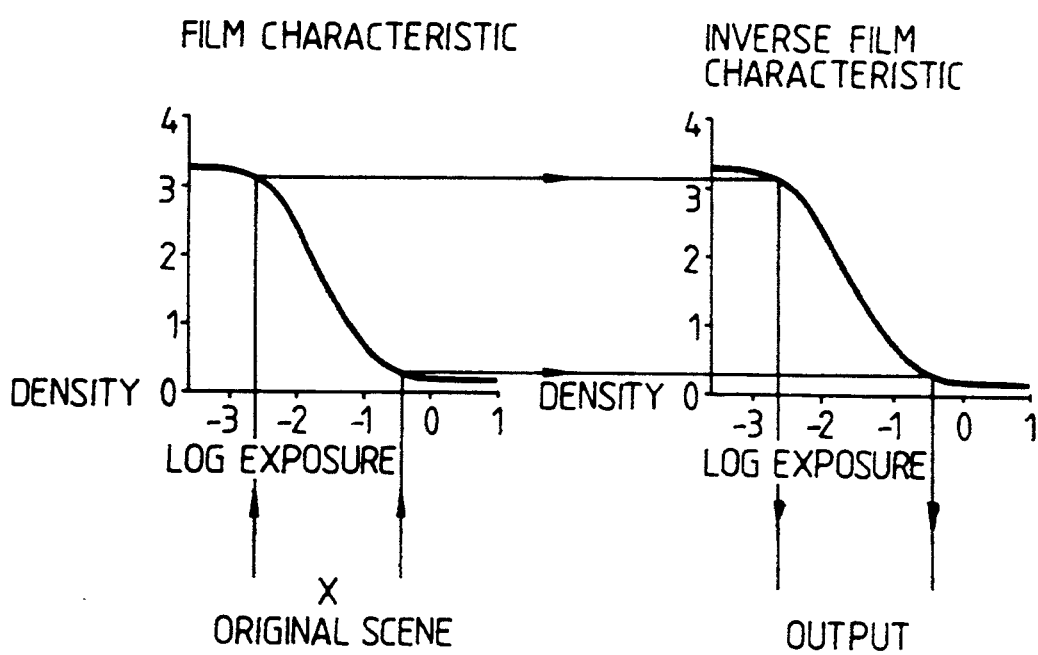
FIG. 4 shows graphically the effect of applying an inverse characteristic function.

It can be seen from FIG. 4 that the original scene is substantially unaffected as a result of the film characteristic function because it has been compensated by the inverse film characteristic function. In FIG. 5 the graph shows the effect of straightening the characteristic of the curve to a 45° line is to keep the input range and output range the same for all different exposures.

Generally the method described substantially compensates for the effect of the film characteristic function, but in some cases where image information is at the extremes of the characteristic function (eg FIG. 4) complete compensation is not achieved. In this Figure the extremes, which are flat, correspond to the film becoming completely clear at the highlight end and receiving less light than required to activate the film at the low-light end.

If the EW and/or EB points fall within the flattened regions, any density variation within the original scene would be recorded with the same density. It is not possible to recover the information subsequently that was in the original scene from these areas and there will therefore be some distortion.

Once the effect of the film characteristic is removed, it is possible to apply any chosen film characteristic by application of a new film characteristic function to the compensated output. By adding an offset to the values any exposure may be introduced. Most films within a characteristic set have very similar characteristic functions. The curves in the preceding Figures are typical of all daylight colour films. Each of the three colour channels, red, green and blue have their own characteristic curve. Due to variations in the film from each batch produced, it is only possible to produce an average for these curves. The data for the shape of these curves is normally published by film manufactures, but may also be determined by performing some controlled exposure tests.

A characteristic set for example, is a set of films that have "film characteristics" that are very similar. This occurs because films from different manufacturers use similar technology and also try to make specific films such that their responses are predictable under similar circumstances.

We claim:

1. A method of generating a representation of an image, said method comprising:
    scanning a film carrying an image to which said film has been exposed, and wherein during exposure the appearance of said image has been modified in accordance with a characteristic function of said film;
    obtaining signals representing the colour component content of said image recorded on said film;
    modifying said signals with a function constituting the inverse of said characteristic function of said film to produce a compensated image; and
    subsequently applying a chosen film characteristic function to the compensated image.

2. A method according to claim 1, wherein said scanned film is a colour film.

3. Apparatus for generating a representation of an image comprising:
    scanning means to scan a film carrying an image so as to obtain signals representing the colour component content of said image recorded on said film;
    modifying means to modify said signals with a function constituting the inverse of a film characteristic function to produce a compensated image; and
    means for subsequently applying a chosen film characteristic function to the compensated image.

4. Apparatus according to claim 3 wherein said modifying means for modifying said signals obtained by scanning said image comprise a log amplifier and wherein said signals are converted to density signals.

* * * * *